United States Patent [19]

Komori et al.

[11] E Re. 29,186

[45] Reissued Apr. 19, 1977

[54] ELECTROPHOTOGRAPHIC COPYING APPARATUS OF SLIT EXPOSURE TYPE

[75] Inventors: Shigehiro Komori, Yokohama; Juro Sato, Kawasaki; Hiroyuki Hattori, Tokyo, all of Japan

[73] Assignee: Canon Kabushiki Kaisha, Tokyo, Japan

[22] Filed: June 19, 1975

[21] Appl. No.: 588,227

Related U.S. Patent Documents

Reissue of:

[64] Patent No.: 3,740,133
Issued: June 19, 1973
Appl. No.: 211,383
Filed: Dec. 23, 1971

[30] Foreign Application Priority Data

Dec. 30, 1970 Japan ..... 45-126316

[52] U.S. Cl. ..... 355/8; 355/51

[51] Int. Cl.[2] ..... G03G 15/30

[58] Field of Search ..... 355/3, 8, 11, 81, 84, 355/75, 50, 51; 271/54

[56] References Cited

UNITED STATES PATENTS

| | | | |
|---|---|---|---|
| 3,510,218 | 5/1970 | Limberger et al. | 355/51 |
| 3,597,074 | 8/1971 | Murgas et al. | 355/50 X |
| 3,728,015 | 4/1973 | Opravil | 355/51 X |

*Primary Examiner*—L. T. Hix
*Assistant Examiner*—Kenneth C. Hutchison
*Attorney, Agent, or Firm*—Fitzpatrick, Cella, Harper & Scinto

[57] ABSTRACT

An electrophotographic copying apparatus of slit exposure type comprises a sheet original conveyor mechanism provided on top of the machine housing, and an original carriage having a transparent sheet of glass or the like provided contiguously with the frame of the conveyor mechanism. When a sheet original is to be copied, such original is transported by the sheet original conveyor mechanism for a through-slit exposure. When a thick original such as book or the like is to be copied, the original carriage with the thick original thereon is forced to move with the conveyor mechanism to disconnect the mechanism from its drive system but connect the drive system to the original carriage, whereafter the carriage is moved for the thick original thereon to be subjected to a through-slit exposure.

26 Claims, 25 Drawing Figures

ELECTROPHOTOGRAPHIC COPYING APPARATUS OF SLIT EXPOSURE TYPE

Matter enclosed in heavy brackets[ ]appears in the original patent but forms no part of this reissue specification; matter printed in italics indicates the additions made by reissue.

BACKGROUND OF THE INVENTION

1. Field of the Invention

This invention relates to a photographic, especially an electrophotographic, copying machine of the through-slit exposure type, and more particularly to a simplified photographic copying machine of such type for use with originals in the form of sheet (hereinafter referred to as "sheet originals") and [and] originals in the form of book or the like (hereinafter referred to as "thick originals").

2. Description of the Prior Art

While a copying machine exclusively for use with sheet originals cannot copy thick originals such as books or the like, it can copy sheet originals simply by placing such originals in a feed port and does not involve the backward or return stroke of its original supporting carriage or its optical system. Therefore, such copying machine can increase the copying speed and is simple to construct and inexpensive to manufacture.

On the other hand, a copying machine for use with books or other thick originals is characterized by its capability of copying sheet originals as well as thick originals, but the machine of this type involves the procedures of opening an original setting cover, placing a sheet original or a thick original on an original supporting glass sheet, closing the cover and depressing a copy button. Further, the return stroke of its original carriage or its optical system is involved not only to limit the copying speed but also to complicate the machine construction and accordingly increase the cost of the machine.

For these reasons, the copying machines of the foregoing two types have been enjoying their own unique demand.

In offices, however, it is usually the case that sheet originals are copied much more often than books or other thick originals, which are rarely required for copying. In view of such situation, a copying machine of a further type has been proposed which can copy both sheet originals and thick originals without reducing its merits as the sheet original copying machine including the simplicity of construction, a higher copying speed, low cost of the manufacture, etc. This versatile copying machine is either such that the machine parts overlying the passage surface for sheet originals are made into a detachable construction which, for a thick original to be copied, may be detached to expose the sheet original transport rollers of the machine proper, whereby the thick original such as book or the like is manually pressed against these rollers and exposed to light while being moved by the rubber rollers to produce a copy, or such that a carrier formed of transparent glass or plastics sheet is provided to support a book or the like thereon and two or more pairs of transport rollers are provided to hold therebetween the ends of the carrier so as to move the carrier for accomplishing exposure. Such machine is characterized by its relatively low cost of the manufacture, but suffers from various demerits and practical problems as enumerated hereunder.

1. The procedure of detaching some of the machine parts is unavoidably involved.

2. Possible variations in the manual pressure imparted to the book or the like for keeping it against the driven rubber rollers and corresponding variations occurring in the speed at which the book or the like is manually moved along the rubber rollers may cause great variations in load to the drive of the machine proper, which in turn would result in unstability of the formed image and accordingly a seriously reduced quality of the resultant copy.

3. The detection of the leading edge of the original effected by a detection switch is subject to errors which would cause a great degree of irregularity in the location of the leading edge of the resultant copy image, because when opened for copying, the leading edge of the thick original such as book or the like (as viewed in the direction of the original feeding) provides a complicated configuration (due to the presence of its cover or to the inclined edge surface of the book formed when it is opened).

4. The roller driving gear or sprocket wheel located at one end of the original transport rollers is unavoidably projected upwardly beyond the plane of the original passage surface to prohibit flat formation of the original passage surface and accordingly prevent a part of a bulky original from being duly copied.

Also, in the type of machine which is provided with a carrier, cumbersome procedures are involved in the maintenance of the carrier, in addition to the troublesome procedures of mounting and dismounting the same carrier.

SUMMARY OF THE INVENTION

In view of the various disadvantages and demerits of prior arts as noted above, the present invention has, for its object, to provide a practical copying machine which holds characteristics as a sheet original copying machine and which can also function as a machine for copying books or other thick originals.

[Accordingly] *According* to the present invention, a sheet original conveyor mechanism is provided on the top of a machine housing and an original carriage having a transparent sheet of glass or like material is provided contiguously with the frame of said mechanism. Where a sheet original is to be copied, such original is transported by transport rollers included in the sheet original conveyor mechanism and then subjected to a through-slit exposure at an illuminating station. Where a thick original such as book or the like is to be copied, such original is placed on the transparent sheet of the original carriage and forced to move with the conveyor mechnism to thereby operatively disconnect this mechanism [form] *from* its drive system and connect this system to a rack or the like forming a part of the original carriage, whereafter the carriage is moved to pass the thick original thereon through the illuminating station for effecting a through-slit exposure.

Accordingly, the present invention is applicable not only to electrophotographic or electrofax copying machines of the image transfer type but generally to other copying machines of the through-slit exposure type.

BRIEF DESCRIPTION OF THE DRAWINGS

The above and other objects and features of the present invention will become fully apparent from the following detailed description of various embodiments thereof taken in conjunction with the accompanying drawings, in which.

DESCRIPTION OF THE PREFERRED EMBODIMENTS

Figure 1:
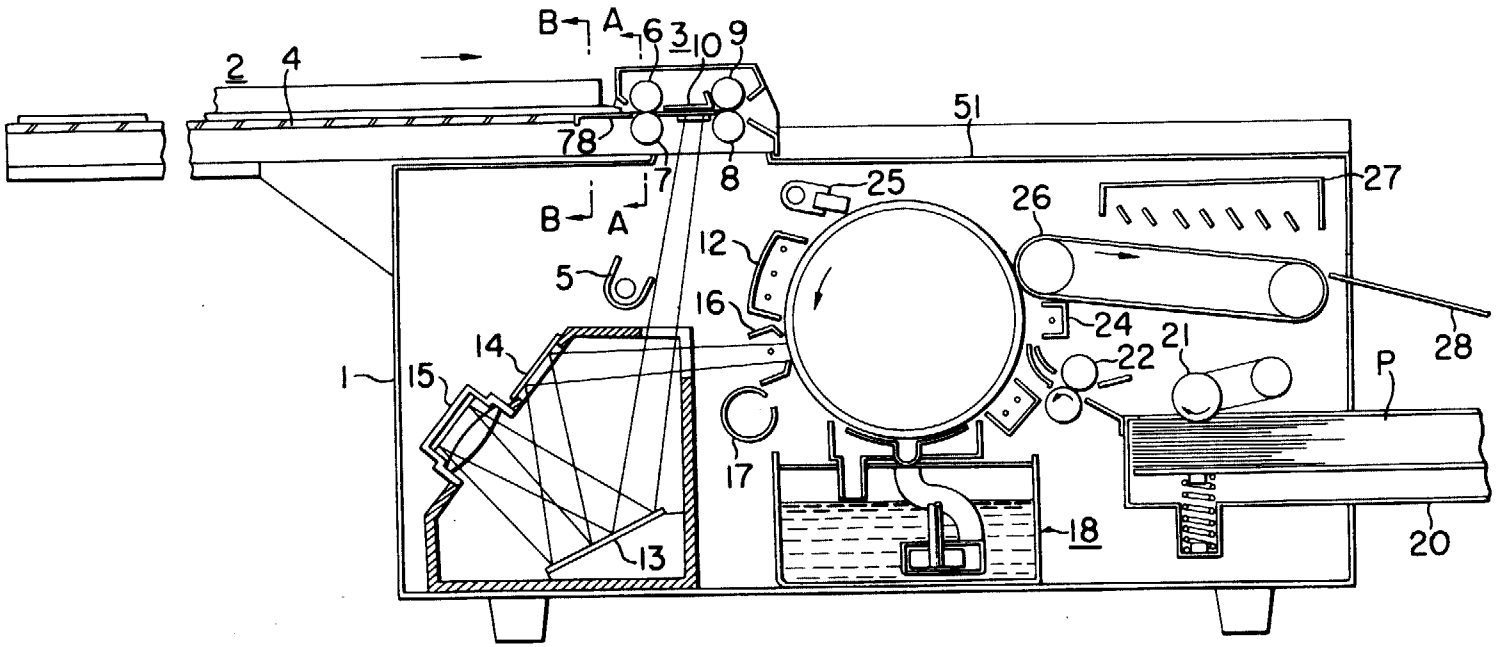
FIG. 1 is a longitudinal sectional view showing an embodiment of the photographic copying machine according to the present invention.

Referring to FIG. 1, there is shown an electrophotographic copying machine to which the present invention is applicable. A machine housing 1 supports thereon an original carriage 2 and an original sheet conveyor mechanism 3. The carriage 2 includes a transparent screen such as glass sheet 4 which is formed contiguously and integrally with the frame 78 of the conveyor mechanism 3. The copying machine is constructed such that when a thin original in the form of a sheet is to be copied the sheet original is conveyed rightwardly, as viewed in FIG. 1, by transport rollers 6–9 in the conveyor mechanism 3 so as to be subjected to a through-slit exposure at an illuminating station and that when a thick original such as book or the like is to be copied the original carriage 2 is moved rightwardly with such original supported thereon so as to be subjected to a through-slit exposure by an illuminating lamp 5.

As shown, various [various] processing elements are disposed around a photosensitive drum 11. The photosensitive drum 11 is first charged by a primary charger 12, and then exposed to an image projected through an optical system 13–15 while being charged or AC-discharged by a secondary charger 16 to form an electrostatic latent image on the surface of the drum. The latent image formed on the photosensitive drum 11 is further subjected to an overall exposure by a lamp 17 to increase the contrast of the image, whereafter the image is developed by a liquid developing device 18 and then post-charged by a charger 19. One of transfer paper sheets piled on a paper feed table 20 is fed by a paper feed roller 21 and passed between a pair of rollers 22 and 23 so as to move along the surface of the drum 11 in timed relationship with the rotation thereof, whereafter the developed image on the surface of the photosensitive drum is transferred to the [fed] transfer paper P while subjected to a bias by a charge 24. After the image transfer, the transfer paper P is separated from the surface of the photosensitive drum 11 by a separator and conveyor device 26 and passed below a drier 27 for drying and fixing, whereafter it is discharged onto a tray 28 disposed outwardly of the machine housing. The photosensitive drum 11 is cleaned by a cleaner 25.

It should be noted that the present invention is not limited to the electrophotographic copying machine of the above-described type.

Figure 2:
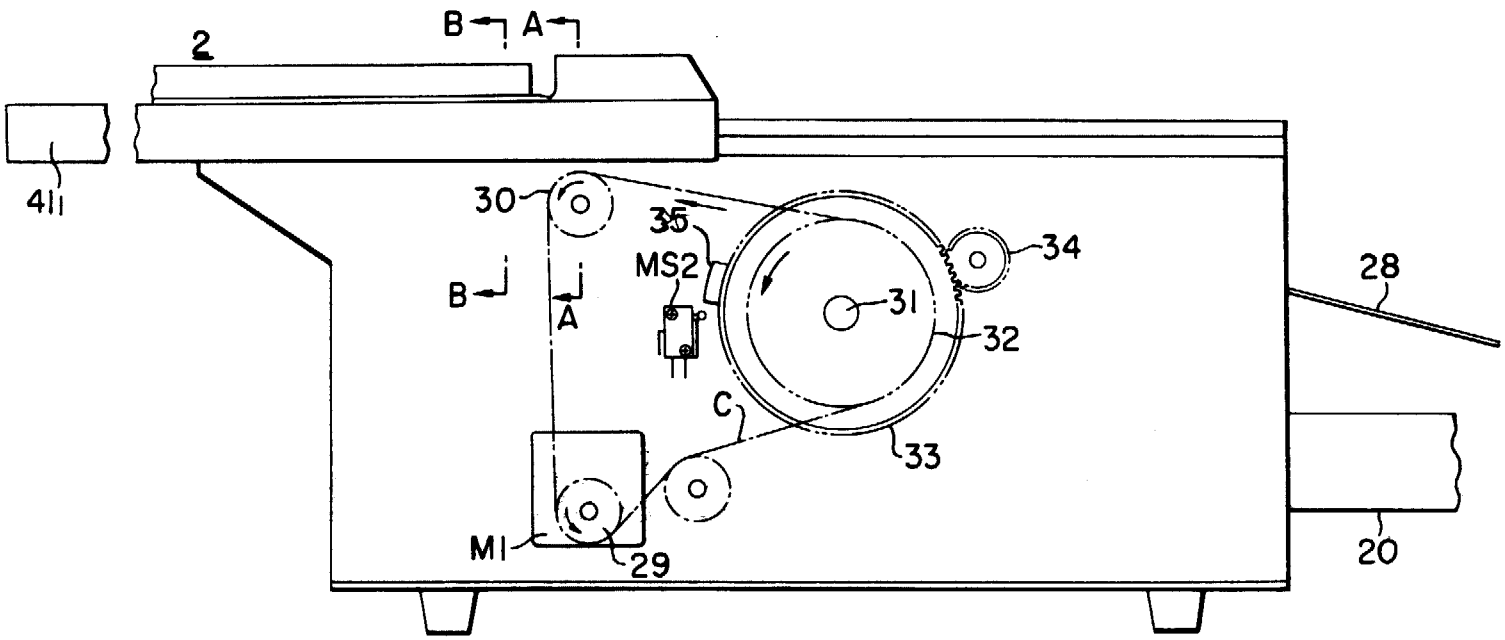
FIG. 2 is a schematic view of the drive mechanism for such copying machine.

Referring to FIG. 2, a sprocket wheel 29 is fixedly mounted on the output shaft of a main motor MI, and a chain C is extended over the sprocket wheel 29, a sprocket wheel 30 for driving the aforesaid transport rollers 6–9 and original carriage 2, and a sprocket wheel 32 fixedly mounted on the shaft 31 of the photosensitive drum, so as to transmit the drive of the motor MI to the shaft 31 and to the sprocket wheel 30. A gear 33 is fixedly mounted on the sprocket wheel 32 and in meshing engagement with a sprocket wheel 34 forming a part of the aforesaid separator and conveyor device 26, to thereby drive the sprocket wheel 34. A cam 35 is attached to a peripheral portion of the gear 33 and is adapted to engage a microswitch MS2 to thereby detect the leading edge of a photosensitive medium attached to the outer surface of the drum.

Figure 3:
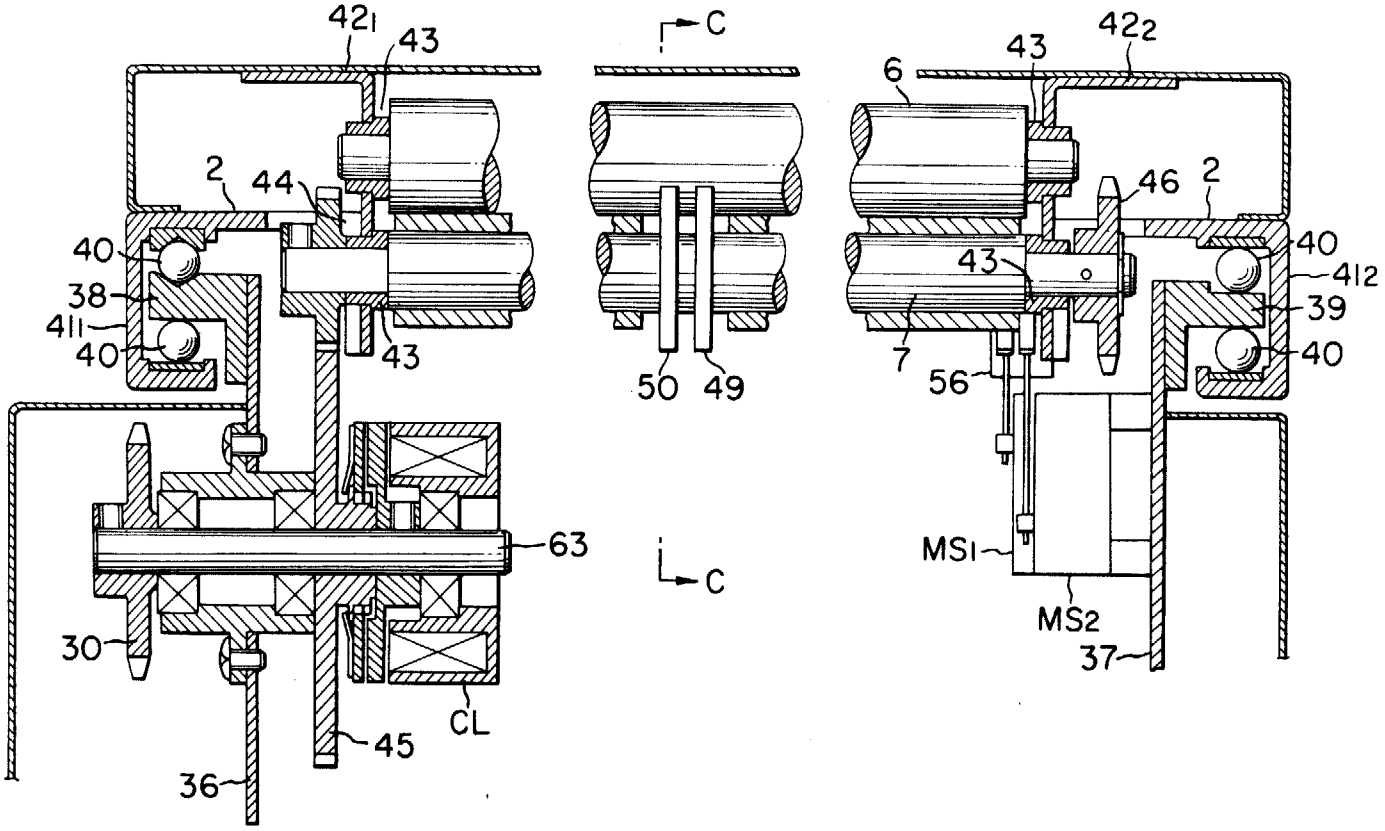
FIG. 3 is a cross-sectional view taken along lines A—A in FIGS. 1, 2, 5 and 6.
Figure 4:
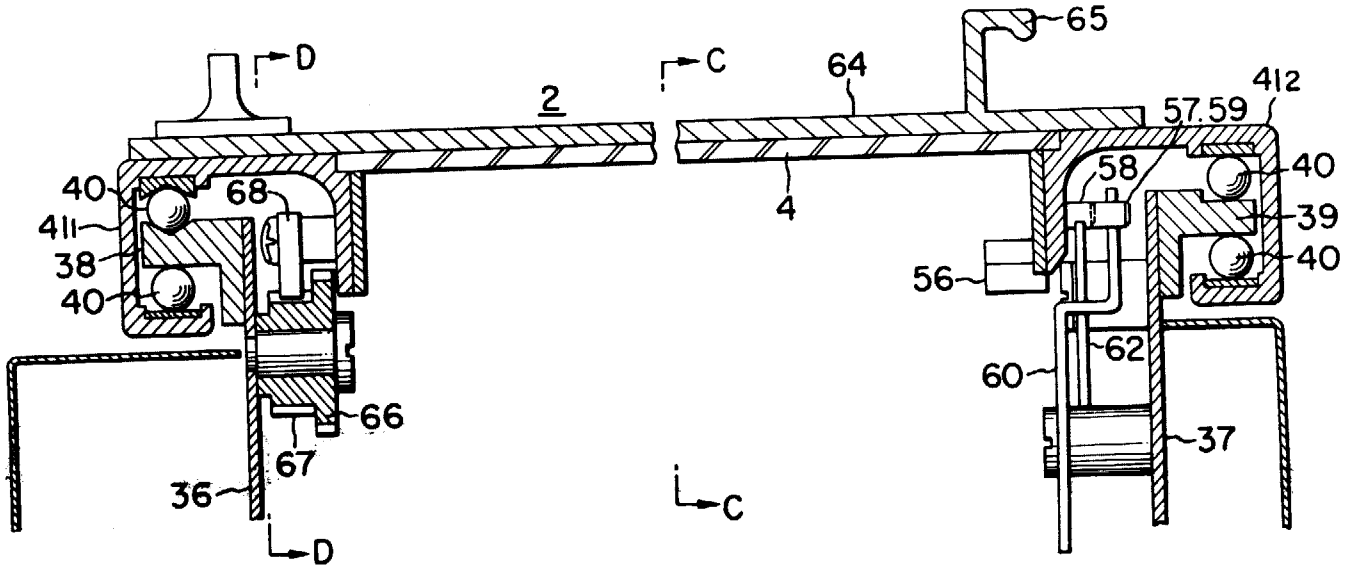
FIG. 4 is a cross-sectional view taken along lines B—B in FIGS. 1, 2, 5 and 6.
Figure 5:
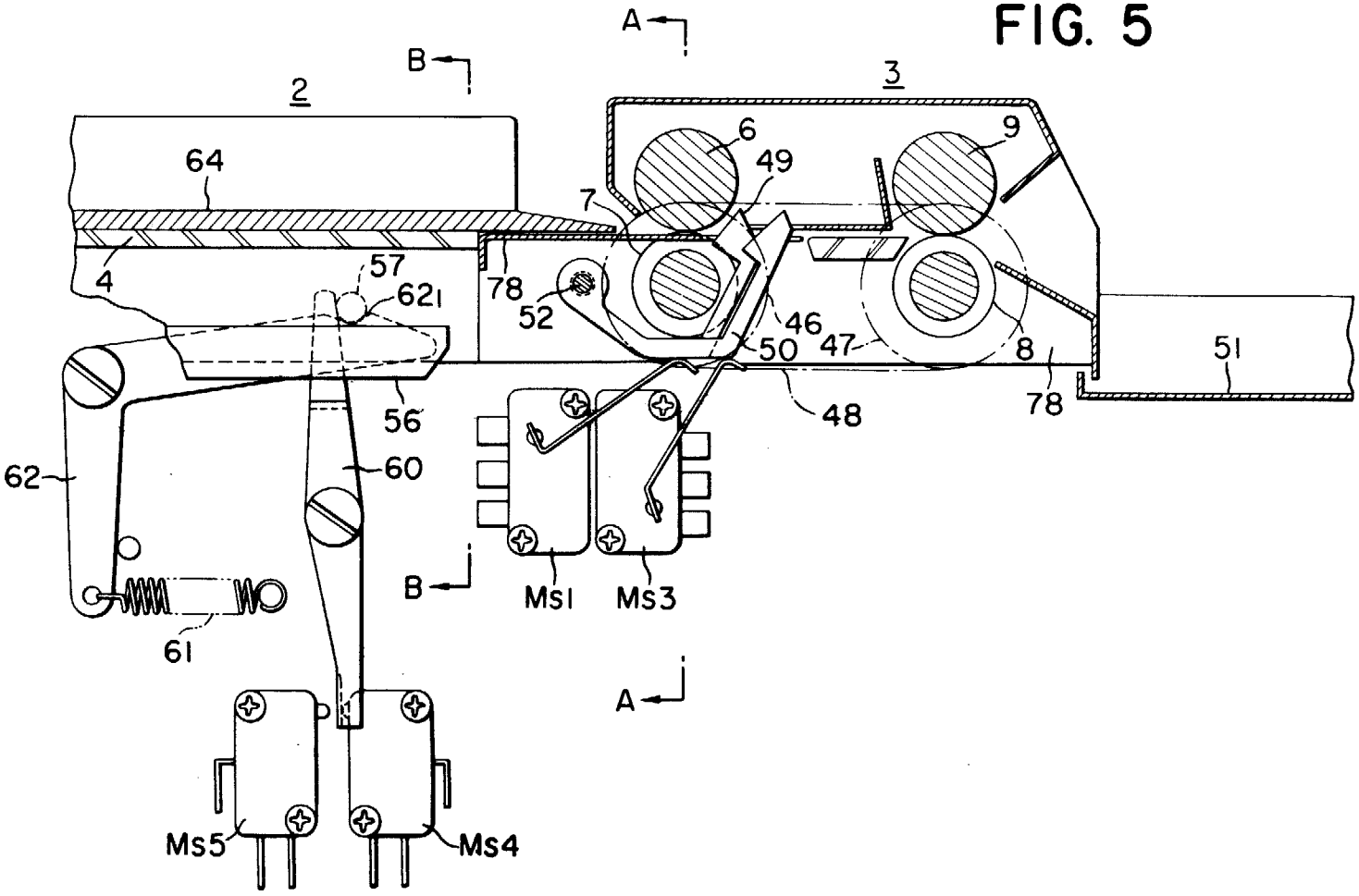
FIG. 5 is a cross-sectional view taken along lines C—C in FIGS. 3 and 4.

Referring now to FIGS. 3 and 4, machine frames 36 and 37 have rails 38 and 39 attached to the tops thereof respectively. The rails 38 and 39 slidably support the opposite angles $41_1$ and $41_2$ of the original carriage 2 by means of balls 40. The two angles $41_1$ and $41_2$ are connected together by a stay (not shown). Original transport rollers 6, 7, 8 and 9 are rotatably journalled to opposite side plates $42_1$ and $42_2$ by means of bearings 43, the side plates being secured to the respective angles $41_1$ and $41_2$. A gear 44 is securely mounted on the roller 7 at one end thereof and driven by a gear 45 mounted on the machine body, while a sprocket wheel 46 is mounted on the same roller 7 at the other end thereof and connected to a sprocket wheel [37] *47* by a chain 48 so as to drive the latter sprocket wheel which is mounted on the roller 8 (FIG. 5).

Figure 7:
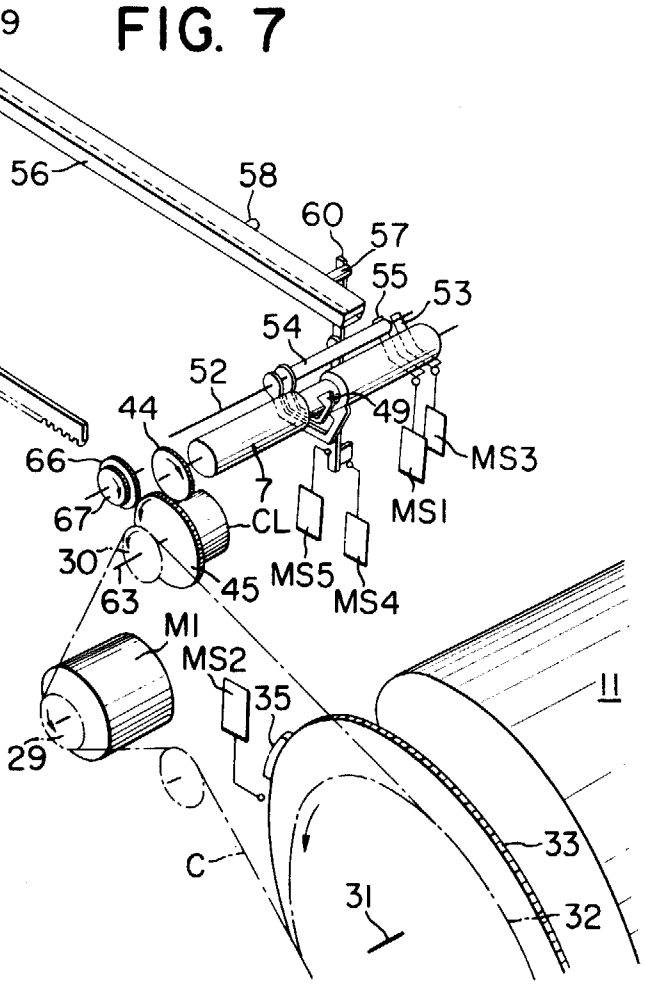
FIG. 7 is a perspective view of the drive and control mechanisms.

Provided between two pairs of rollers 6, 7 and 8, 9 are levers 49 and 50 for detecting the leading edge of the original. The original is moved to strike and clear the levers 49 and 50 and passes to the exposure station 10, where it is exposed to light emitted from therebelow, and then discharged onto an original receptacle 51 disposed on the upper part of the machine body. As shown in FIGS. 5 and 7, the relationship between the two levers 49, 50 and microswitches MS3 is such that when the lever 49, secured to a pipe 54 surrounding a lever shaft 52, is pushed by the original, the pipe 54 is rotated to actuate an arm 55 secured to one end thereof and accordingly actuate the microswitch MS1 and that when the lever 50, secured to the lever shaft 52, is pushed by the original, the shaft 52 is rotated to actuate an arm 53 secured to one end thereof and accordingly actuate the microswitch MS3. Although not shown, springs are provided to normally bias the two levers 49 and 50 counter-clockwise into their shown positions.

As it passes, the sheet original first actuate the lever 49 to thereby actuate the microswitch MS1, and then actuates the lever 50 to thereby actuate the microswitch MS3. Where the original carriage is in use (i.e. where a thick original such as book or the like is to be copied), as will be described further, the original carriage 2 is moved so that a cam [58] *56* secured to the angle $41_2$ thereof actuates the microswitch MS1 and then the microswitch MS3. The angle $41_2$ has dowels 57, 58, and 59 attached thereto (see FIGS. 4, 5 and 7, although in FIG. 7 these dowels are shown as if attached to the cam 56, for simplicity), so that when the original carriage 2 is in its shown position (or "home position") the dowel 57 strikes a lever 60 (FIG. 5) and this is detected by a microswitch MS4. In order to keep the carriage 2 stationary then, the recessed portion $62_1$ of a lever 62 is normally forced against the dowel 57. When it is desired to move the carriage 2, the carriage is manually forced to release the engagement between the recessed portion $62_1$ and the dowel 57. As will be further described, the dowel 58 is short in length and adapted to engage the recessed portion $62_1$ of the lever 62 and thereby avoid contacting the lever 60 (see FIG. 4) when the carriage is temporarily stopped for aligning the leading edge of the original. The dowel 59 is located at the rear end of the carriage 2 and, upon completion of the movement thereof, it is adapted to actuate a microswitch MS5 by means of the lever 60 so as to produce a signal indicative of the completed movement of the carriage 2.

Figure 6:
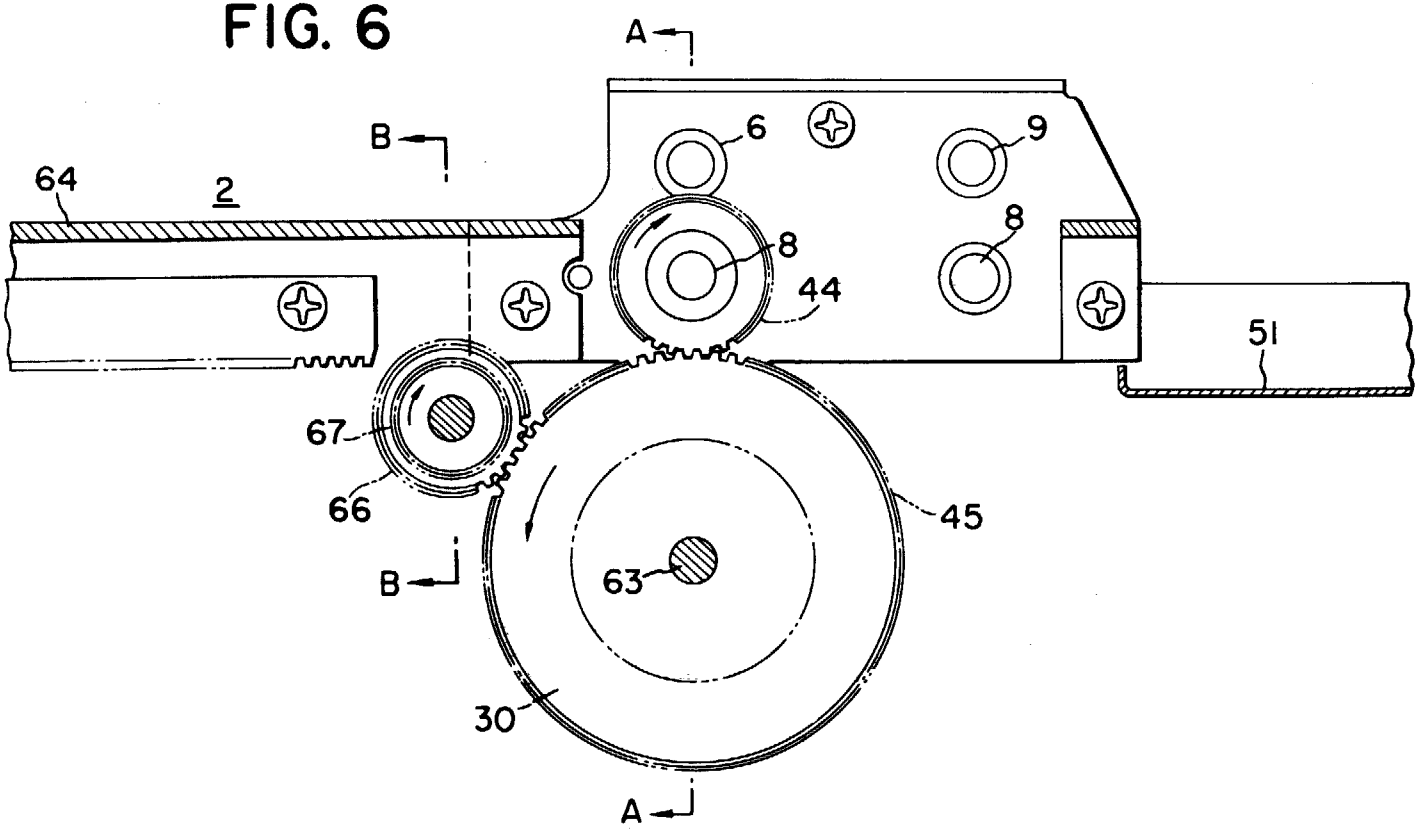
FIG. 6 is a cross-sectional view taken along lines D—D in FIGS. 3 and 4.

In FIGS. 3, 6 and 7, the drive from the main motor M1 is transmitted to the sprocket wheel 30 which rotates the shaft 63. The shaft 63 and the gear 45 are connected together by means of an electromagnetic clutch CL. Where a sheet original is to be copied, the gear 45 is engaged with the gear 44 of the transport roller 7 to drive the original transport rollers 6–9. As the sheet original is thus transported, the leading edge thereof strikes the lever 49 to actuate the microswitch MS1 so as to disconnect the clutch CL and accordingly stop the original transport rollers 6–9. Subsequently, the leading edge of the photosensitive medium on the outer surface of the normally rotating drum 11 is detected by engagement between the cam 35 and the microswitch MS2 so as to couple the clutch CL and resume the movement of the sheet original synchronously with the rotation of the photosensitive drum 11, thereby accomplishing a through-slit exposure.

Where a thick original such as *a* book or the like is to be copied, the original setting cover 64 of the original carriage 2 is opened counter-clockwise by gripping the handle 65 thereof and such a thick original is placed on the transparent screen 4, whereafter the cover 64 is again closed (FIG. 4). Then the original carriage 2 is manually moved rightwardly to release the described engagement between the recessed portion $62_1$ of the lever 62 and the dowel 57 and accordingly release the engagement between the gears 44 and 45 in the sheet original conveyor mechanism 3, so that a pinion 67 integral with a gear 66 which is in engagement with the gear 45 is brought into engagement with a rack 68 attached to the angle $41_1$ of the carriage 2, whereby the carriage 2 is now driven rightwardly by the main motor M1. Subsequently, the cam 56 actuates the microswitch MS1 to disconnect the clutch CL, thus stopping the carriage 2. Any tendency of the carriage to overtravel by its own inertia which may then occur is prevented by the dowel 58 engaging recessed portion $62_1$ of the lever 62. Thereafter, in the same way as described with respect to the copying of a sheet original, the clutch CL is coupled by a signal from the microswitch MS2 so that the carriage 2 starts to move synchronously with the drum 11 for the exposure process. The carriage 2 further moves until the dowel 59 at the rear end thereof strikes the lever 60 to actuate the microswitch MS5 and disconnect the clutch CL, whereupon the carriage 2 is stopped. Thereafter, when the original carriage 2 is manually returned to its initial position, the dowel 57 strikes the lever 60 to actuate the microswitch MS4 and couple the clutch CL, thus bringing the machine into its initial condition.

The forward and upper surface of the original setting cover 64 is sloped downwardly in the direction toward the sheet original conveyor mechanism 3 so as to permit a sheet original to be inserted in place from the top of the cover 64 with its handle 64 as the guide.

Figure 8:
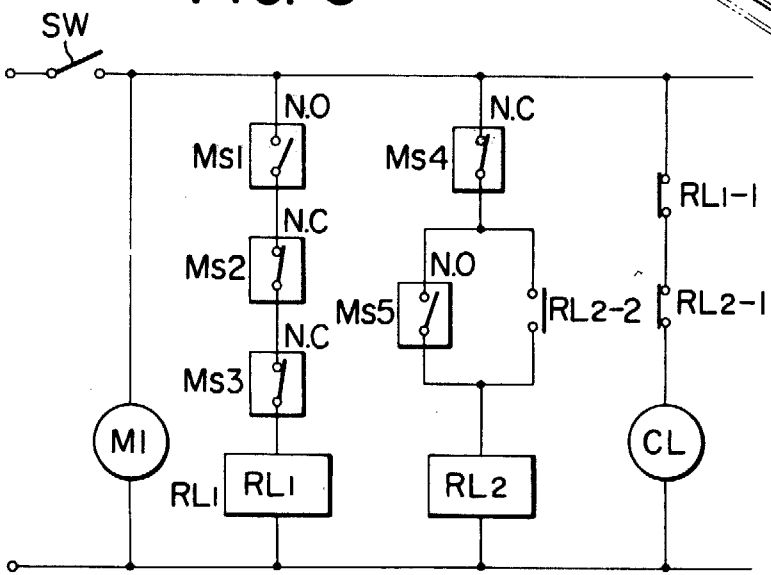
FIG. 8 is a block diagram of the electric circuit in the machine control mechanism.

FIG. 8 shows an example of the electric circuit suitable for the above-described copying machine, although this only shows those parts related to the driving of the drum and original. By closing a main switch SW, the motor M1 starts revolution. Thereupon, power is supplied to the clutch CL through the normally closed contacts RL1-1 and RL2-1 of two relays RL1 and RL2, whereby the clutch CL is connected. In this position, drive force is being imparted to the original transport rollers 6–9 and, when the original carriage 2 is forced rightwardly, the pinion 67 is brought into engagement with the rack 68 to drive the carriage 2. Subsequently, a sheet original is fed or the carriage 2 is moved rightwardly to close the normally open contact of the microswitch MS1 in the manner described, so that power flows through the normally closed contacts of the microswitches MS2 and MS3 to energize the relay RL1. Thus, the normally closed contact RL1-1 of this relay is opened to disconnect the clutch CL and stop the gear 45, thereby stopping the sheet original or the carriage 2. Subsequently, the cam 35 moving together with the drum 11 actuates the microswitch MS2 to open its normally closed contact RL1-1 is thus closed to connect the clutch again. Thus, the sheet original or the carriage 2 is again driven to actuate the microswitch MS3 to open its normally closed contact, so that the cam 35 passes over the microswitch MS2 to prevent any power supply to the relay RL1 even after its normally closed contact is closed. As it passes, the trailing edge of the sheet original opens the normally open contact of the microswitch MS1 and then closes the normally closed contact of the microswitch MS3, so that no power is supplied to the relay RL1, thus maintaining the clutch CL closed. In the closed position of the normally closed contact of the microswitch MS4, the original carriage 2 is moved to its terminal end position in the described manner, whereupon the dowel 59 closes the normally open contact of the microswitch MS5 to permit power supply to the relay RL2, which thus self-holds by its normally open contact RL2-2, and at the same time opens its normally closed contact RL2-1 to disconnect the clutch CL, so that the original carriage 2 may be moved leftwardly to its initial position. When the carriage 2 is manually moved to its initial position, the microswitch MS4 is actuated to open its normally closed contact, whereby the self-hold of the relay RL2 is released to connect the clutch CL. Thus, the entire machine restores its initial condition.

Figure 9:
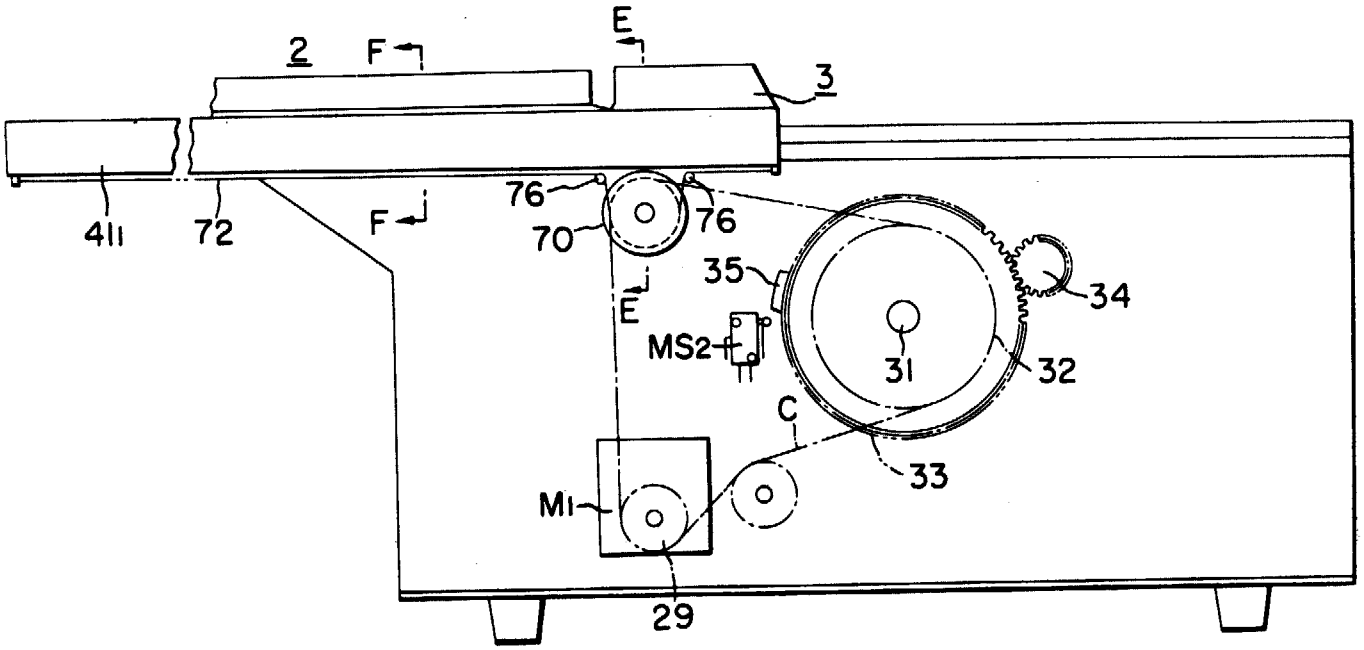
FIG. 9 schematically shows another embodiment of the drive mechanism.
Figure 10:
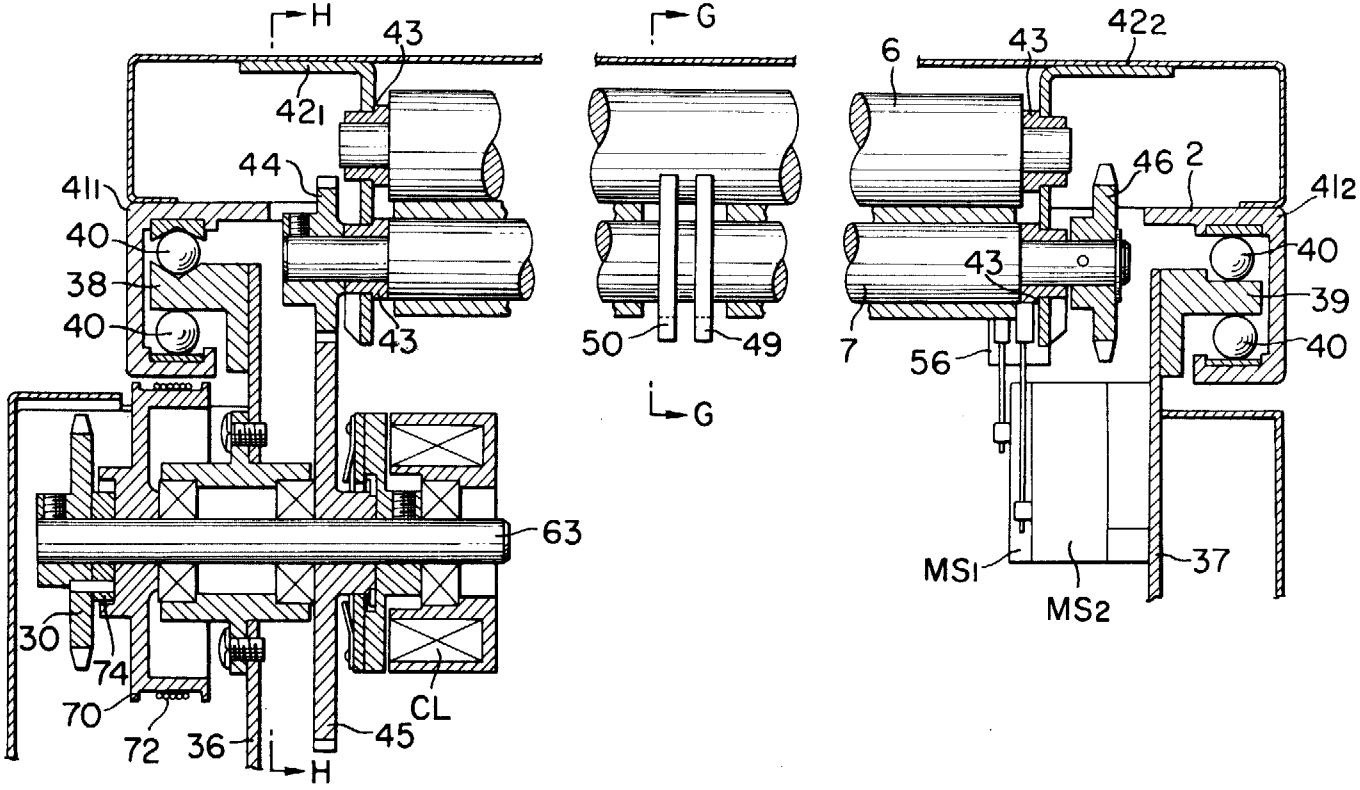
FIG. 10 is a cross-sectional view taken along lines E—E in FIGS. 9, 12 and 13.
Figure 11:
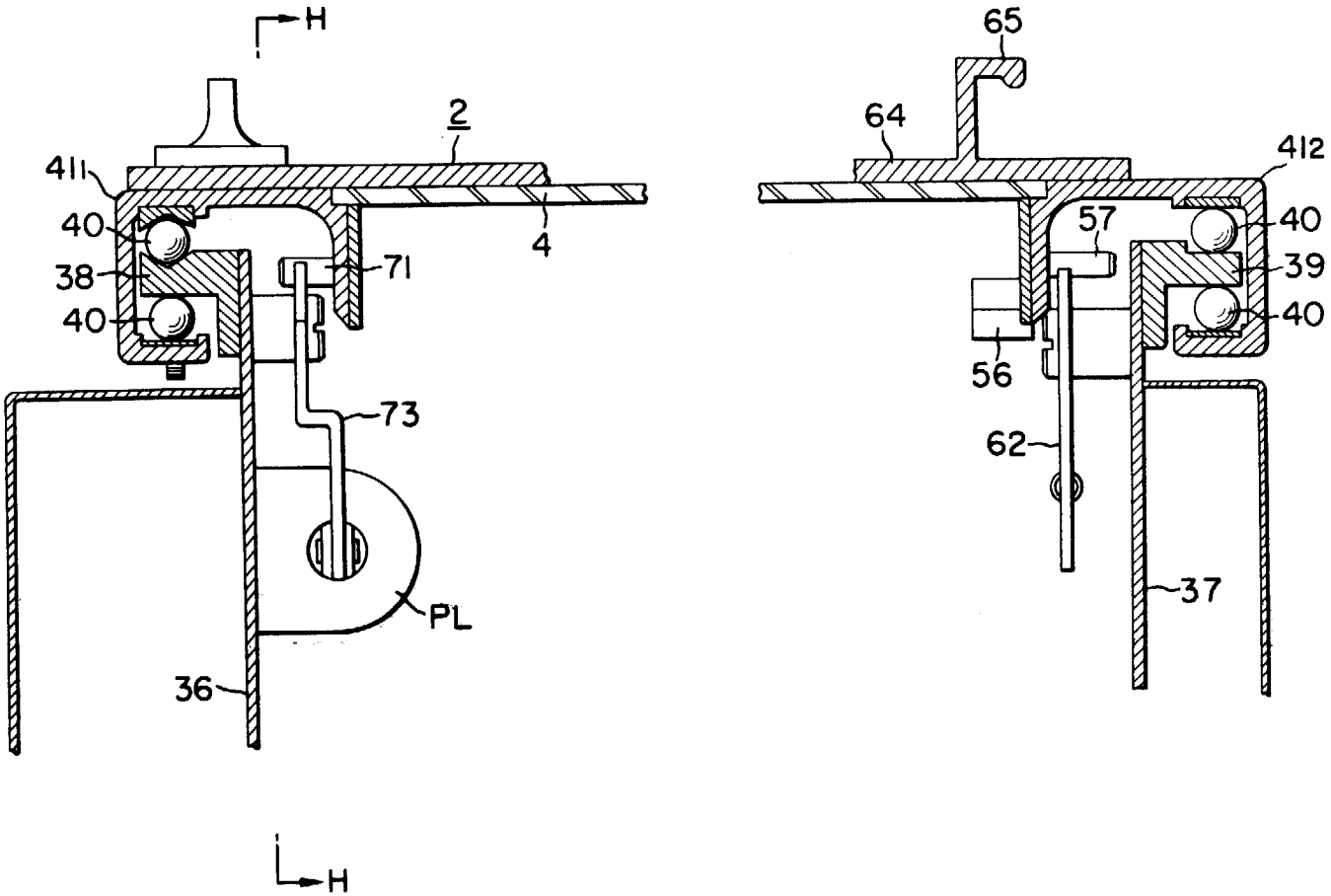
FIG. 11 is a cross-sectional view taken along lines F—F in FIGS. 9, 12 and 13.
Figure 12:
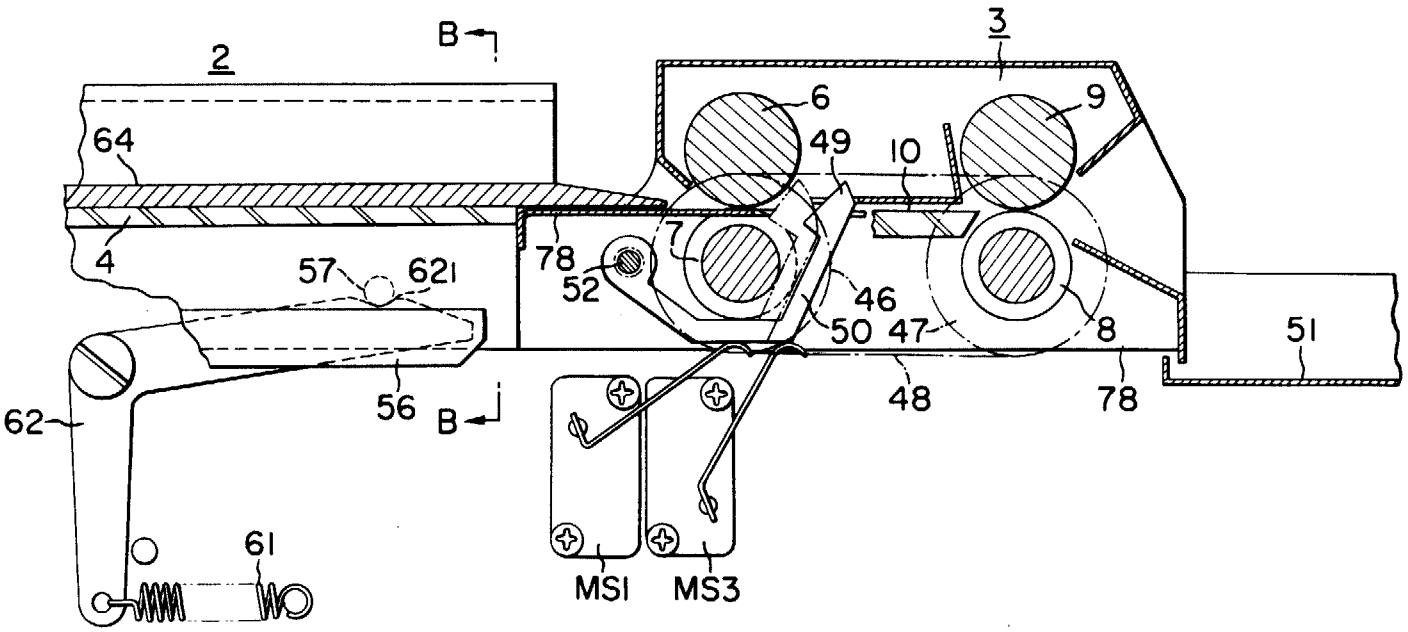
FIG. 12 is a cross-sectional view taken along lines G—G in FIGS. 10 and 11.

FIGS. 9 to 15 show an example of the mechanism for manually moving the original carriage 2 without using the rack mechanism shown in the foregoing embodiment. When a sheet original is being copied, the original carriage 2 is stopped by the engagement between the dowel 57 attached to the cam 56 (or angle $41_2$) and the recessed portion $62_1$, as shown in FIGS. 11 and 12. The above-described operation refers to the case where the original to be copied is in the form of a sheet, but when a book or other thick material is to be copied, the original setting cover 64 (FIG. 11) is opened counterclockwise by gripping the handle 65 thereof and the thick original is placed on the transparent screen 4 such as glass sheet, whereafter the original setting cover 64 is closed and the original carriage 2 is forced rightwardly to release the engagement between the dowel 57 and the recessed portion $62_1$ of the lever 62 and at the same time release the engagement between the gear 45 and the gear 44 of the sheet original conveyor mechanism 3.

Figure 13:
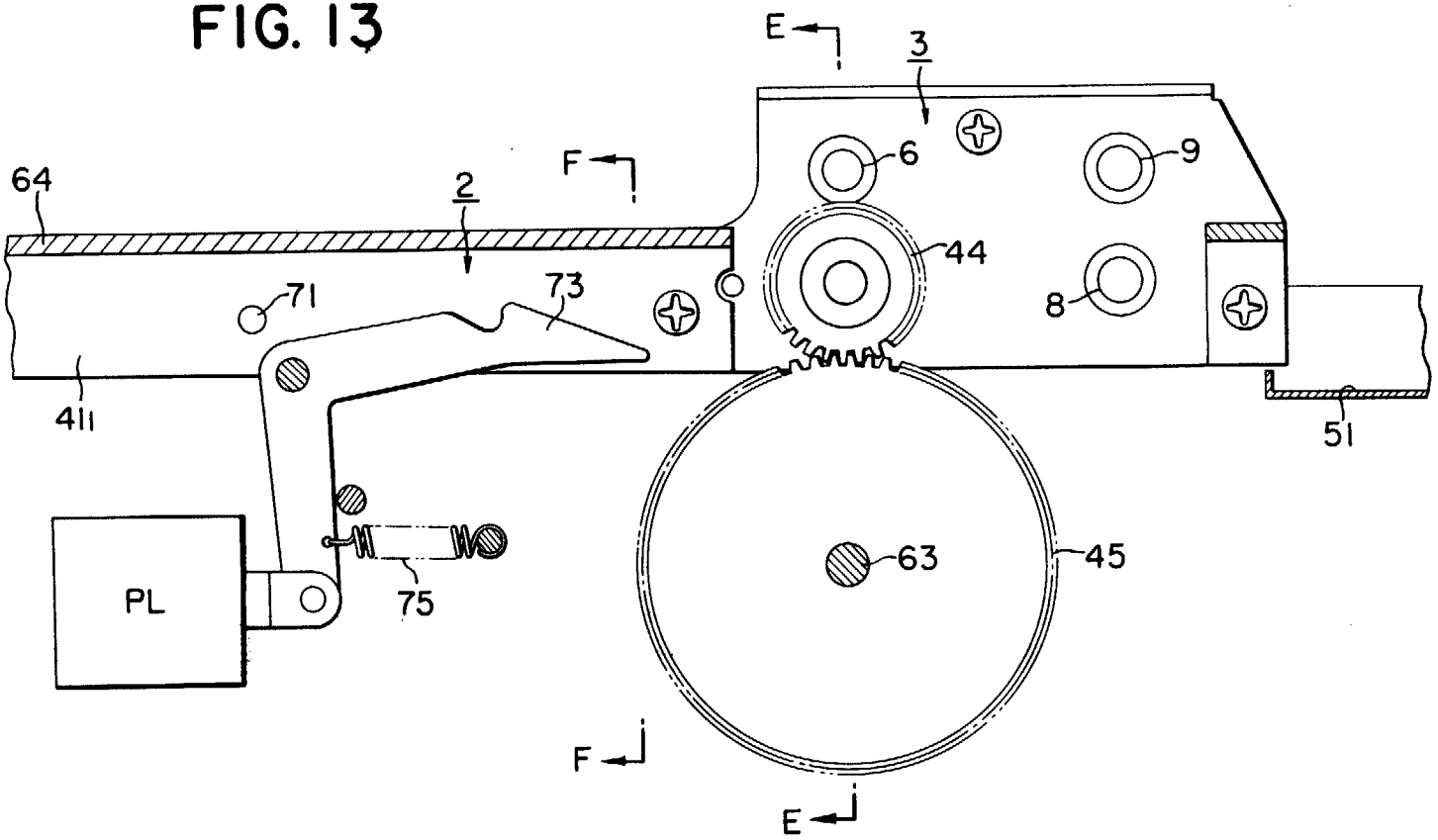
FIG. 13 is a cross-sectional view taken along lines H—H in FIGS. 10 and 11.
Figure 14:
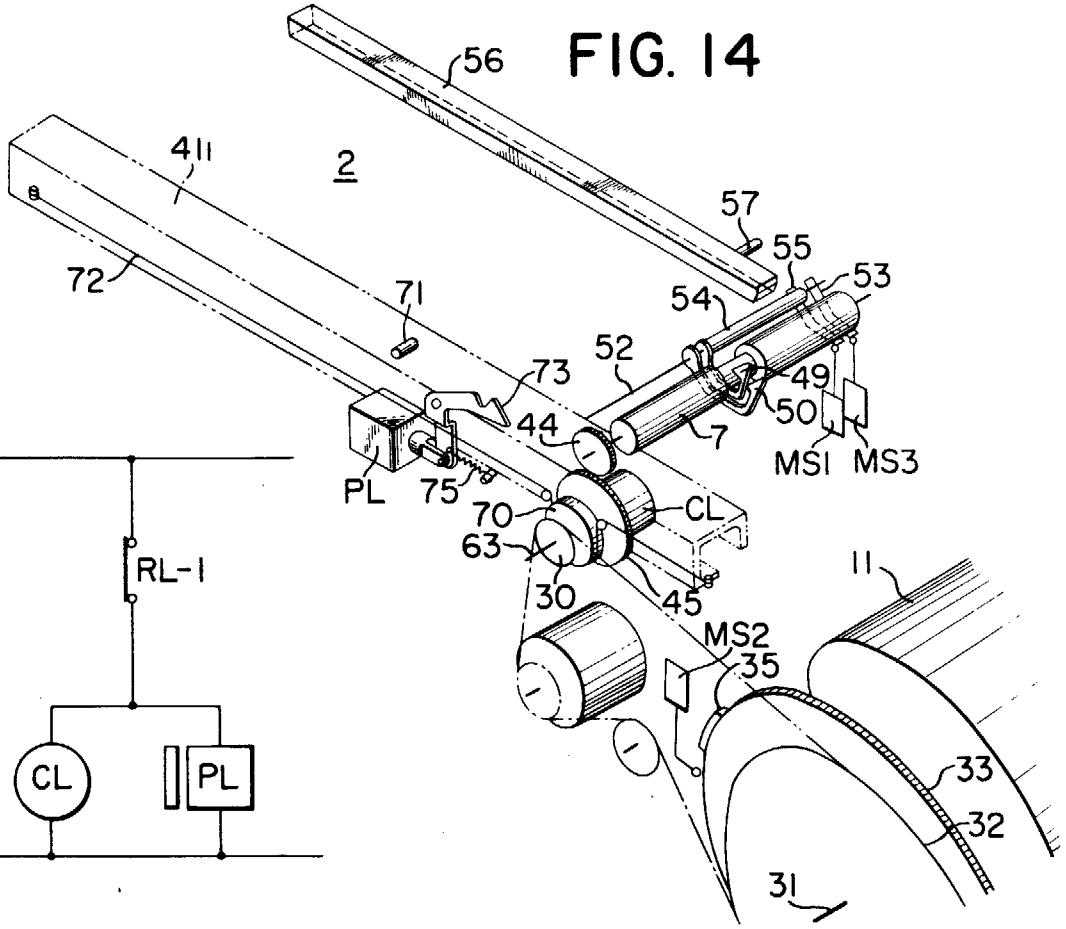
FIG. 14 is a perspective view of the drive and control mechanisms.

Sprocket wheel 30 and drum 70 for synchronizing the movement of the original with the rotation of the photosensitive drum 11 are connected together by a known one-way clutch 74 (FIG. 10) in such a manner that no drive is imparted from the sprocket wheel 30 to the synchronizing drum 70 but that drive can be transmitted conversely from the synchronizing drum 70 to the sprocket wheel 30. A wire 72 is wound leftwardly in a plurality of turns on the drum 70 via a pulley 76, and the wire 72 and drum 70 are connected together against slipping relative to each other. The opposite ends of the wire 72 are secured to the opposite ends of the angle $41_1$ (FIGS. 9, 10 and 14). A dowel 71 is attached to the angle $41_1$ and adapted to engage a lever 73 mounted on the machine body to stop the carriage 2 when aligning the leading edge of the original (FIGS. 11, 13 and 14). A plunger PL for controlling the lever 73 is controlled similarly to the electromagnetic clutch CL.

When the original carriage 2 is forced rightwardly such movement is transmitted via the wire 72 to drive the synchronizing drum 70. The drive in this direction is transmitted via the one-way clutch 74 to the sprocket 30, thus synchronizing the speed of the carriage 2 and the peripheral speed of the photosensitive drum 11. As the carriage 2 is further forced to move, the cam 56 actuates the microswitch MS1 to cut off the input to the plunger PL which has been supplied with power, whereby the lever 73 is returned to its position of FIG. 13 by the force of spring 75 and engaged with the dowel 71 to stop the carriage 2. Subsequently, as in the case of copying a sheet original, the plunger PL is again attracted by the signal from the microswitch MS2 to release the engagement between the lever 73 and the dowel 71. The rightward force then imparted to the carriage 2 causes the carriage to move in synchronism with the rotation of the photosensitive drum 11 so as to effect a through-slit exposure thereon. When the carriage 2 is withdrawn leftwardly after completion of the exposure, the one-way clutch 74 in that position does not connect the synchronizing drum 70 and the sprocket wheel 30, so that the carriage 2 can be returned to and stay at its initial position with the dowel 57 of the cam 56 (or of the angle $41_2$) engaged with the recessed portion $62_1$ of the lever 62.

Figure 15:
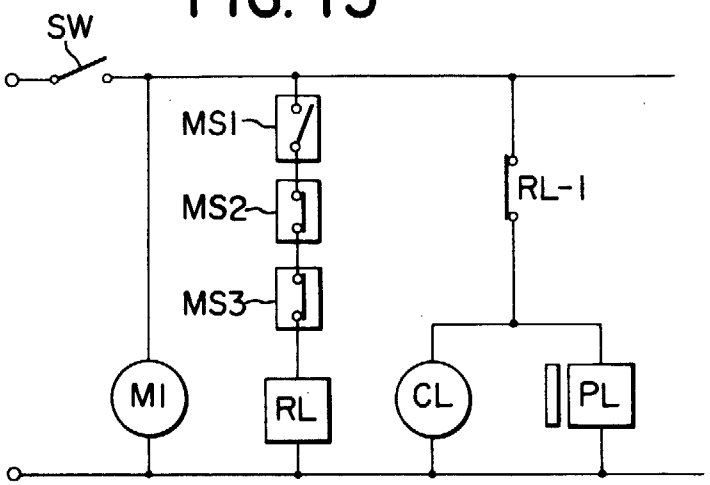
FIG. 15 is a block diagram of the electric circuit in the machine control mechanism.

FIG. 15 shows an example of the electric circuit suitable for the copying machine described just above, although it only shows the parts related to the driving of the drum and the original. By closing the main switch SW, the motor M1 starts revolution. Thereupon, power is supplied to the clutch CL and plunger PL through the normally closed contact RL-1 of a relay RL so that the clutch CL connects the shaft 63 and the gear 45 while the plunger PL is attracted. Subsequently, a sheet original is fed or the original carriage 2 is forced rightwardly to close the normally open contact of the microswitch MS1 in the described manner, so that power flows through the normally closed contacts of the microswitches MS2 and MS3 to energize the relay RL. As the result, the relay RL opens normally closed contact RL-1 to cut off the power supply to the clutch CL and plunger PL, whereupon the clutch CL is disconnected to stop the gear 45 and accordingly the sheet original, and the plunger P1 is released from its attracted position to cause the dowel 71 to engage the lever 73 and thereby stop the carriage 2.

Subsequently, where the original sheet is the object to be moved, it is subjected to a through-slit exposure and then discharged out of the machine in the sequence of operation described previously. Where the original carriage 2 is the object to be moved, the plunger PL is again attracted by the signal from the microswitch MS2 to release the engagement between the dowel 71 and the lever 73 to permit the movement of the carriage 2, so that the carriage 2 is moved rightwardly in synchronism with the photosensitive drum 11 to effect a through-slit exposure thereon.

The backward or return stroke of the original carriage 2 can be accomplished not only manually but also automatically. For example, an electromagnetic clutch or the like may be provided to reverse the direction of drive force of the motor and transmit it to the carriage 2.

The construction of the present invention described above results in the following advantages:

a. The copying machine can be used to copy sheet originals or thick originals such as books and the like simply by changing the mode of operation without modifying the machine parts in any way, and the changeover of the mode of operation can be accomplished very simply.

b. In addition to the suitability for use with sheet originals, the copying machine of the present invention eliminates the disadvantages previously enumerated under items 1 to 4 and fully achieves the performance as a copier for thick originals.

c. When effecting a through-slit exposure by moving the original carriage 2 shown in FIGS. 9 to 15, the carriage 2 is manually moved to operatively associate it with the driving system of the machine proper via one-way clutch as described already, so that the linear speed of the original and the peripheral speed of the photosensitive drum can be synchronized with each other by a simple mechanism.

While the invention has so far been described as applied to copying machines of the image transfer type, it will be apparent that it is equally applicable to copying machines of the direct type (i.e. silver-salt type or electrofax type).

In the case of the copying machine of the image transfer type which has been described as an embodiment of the present invention, an electrostatic latent image is formed on the photosensitive drum after the through-slit exposure, and the latent image is then developed and transferred to transfer paper. The transfer paper, which is kept in intimate contact with the outer surface of the photosensitive drum, may readily be separated therefrom by utilization of electrostatic force. Means for such separation will now be described.

During the image transfer process, transfer paper must be kept in intimate contact with the outer peripheral surface of the photosensitive drum, whereas once the image transfer has been completed the transfer paper must be separated from the surface of the photosensitive drum so that the drum surface may be cleaned in preparation for the next copying cycle. However, the electrostatic force with which the transfer paper is attracted to the surface of the photosensitive drum is so strong that it is difficult to separate the former from the latter, and thus some separator means must be provided anyway.

Figure 16:
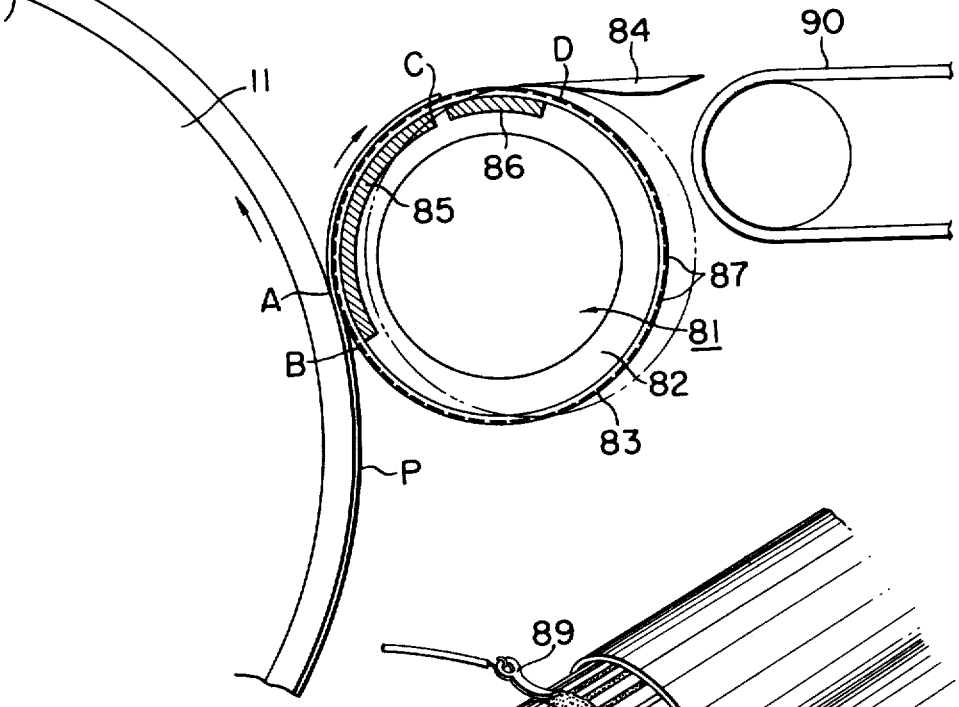
FIGS. 16 and 17 are cross-sectional and perspective views showing an example of the transfer paper separation in an embodiment of the transfer type copying machine according to the present invention.
Figure 17:
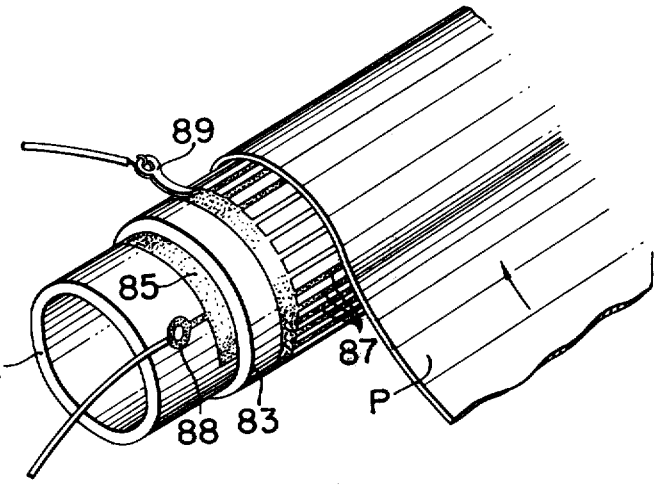

FIGS. 16 and 17 show an electrostatic chuck 81 in the form of a roller. The roller-shaped electrostatic chuck 81 is normally disposed in spaced-apart relationship with the photosensitive drum 11 at a position as indicated by an imaginary circle, in order to prevent the back side of the transfer paper P from being stained because of the offset printing, and only during the image transfer process, the chuck 81 is adapted to be urged against the surface of the photosensitive drum 11 with the transfer paper P interposed therebetween. The roller-shaped electrostatic chuck 81 comprises a dielectric, fixed, inner cylinder 82 and a dielectric, outer cylinder 83 fitted over the inner cylinder 82 and rotatable in intimate contact therewith. The outer periphery of the inner cylinder 82 is formed with two separately embedded electrode plates 85 and 86, one of which 85 extends from a point B, past a point A at which the transfer paper P begins to contact the chuck 81, to a point C nearer to the delivery station to the conveyor unit and the other electrode plate 86 extends along a peripheral area D corresponding to a separator pawl 84. The entire outer peripheral surface of the inner cylinder 82 including the two electrode plates is finished to provide a smooth surface. Over the entire outer periphery of the outer cylinder 83, an electrode 87 in the form of grid or strips (these strips are connected together) is embedded with its outer surface exposed (desirably in such a manner that the exposed surface of the electrode 87 is flush with the surface of the outer cylinder 83). The outer cylinder 83 is fitted over the inner cylinder 82 and driven from suitable drive means (not shown) for synchronous rotation with the photosensitive drum 11.

A high DC voltage is applied to the electrode plate 85 on the inner cylinder 82 through a terminal 88 while either a voltage of the opposite polarity is applied to the other electrode plate 86 or this electrode plate 86 is grounded and the electrode 87 of the outer cylinder 83 is grounded as by a conductive brush 89.

When the outer cylinder 83 is rotated clockwise from the above-described position and brought into contact with the transfer paper P at the point A as the paper is moved counter-clockwise in intimate contact with the surface of the photosensitive drum 11, the paper P is electrostatically separated from the surface of the drum 11 and attracted into contact with the surface of the outer cylinder 83. The outer cylinder 83 with the transfer paper P thus attracted thereto is then rotated to bring the paper P past the operating terminal point C of the electrode plate 85 and pass it to the other electrode plate 86 to which a voltage of the opposite polarity has been applied, whereupon the electrostatic attraction is released between the outer cylinder 83 and the transfer paper P or a repulsion acts on the transfer paper P, thus assisting the separator pawl 84 in separating the paper. In this instance, the separator pawl 84 is grounded or supplied with a suitable potential. Thereafter, the transfer paper P is moved on the separator pawl 84 with its back side in contact with the latter and delivered onto a conveyor belt 90, which conveys the paper to pass below a drier 91 and discharge onto a tray 80.

Figure 18:
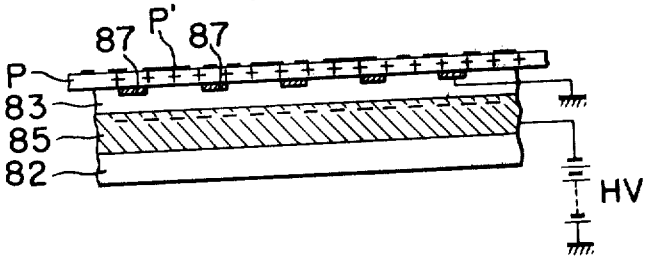
FIG. 18 illustrates the principle of such separation.

The principle of the foregoing electrostatic chuck will be described with reference to FIG. 18. For example, when negative charges are applied from a high DC voltage source HV to the embedded electrode plate 85 extending from the point B to the point C on the inner fixed cylinder 82, positive charges corresponding to the applied potential are induced on the grounded surface electrode 87 of the outer cylinder 83. When the surface of the outer cylinder 83 is contacted by the relatively conductive surface of the transfer paper P bearing a transferred image P' (this surface is generally conduction-treated by a coating such as PVA), that surface of the paper P is electrically connected with the electrode 87 to thereby induce positive charges similar to those induced on the electrode 87, so that an electrostatic attraction acts between the electrode plate 85 and the transfer paper P to bring the latter into firm and intimate contact with the surface of the outer cylinder 83. In this case, a greater attraction for the same voltage could be caused to act on the transfer paper if the outer cylinder 83 is formed of a material of higher dielectric constant, lesser thickness and greater dielectric strength.

As will be appreciated from the foregoing, the present invention enables the transfer paper P to be positively and readily separated from the photosensitive drum 11, simply by rotating and contacting the electrostatic chuck 81 with the back side of the transfer paper P as it is in intimate contact with the photosensitive drum 11, but without affecting the unfixed image on the paper P and without requiring any large-scale mechanism.

Figure 19:
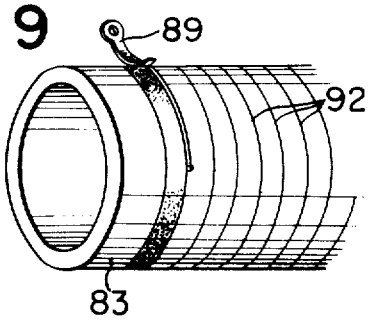
FIG. 19 is a perspective view showing another example of the transfer paper separation.

Most preferably, the grid-like or strip-like electrode 87 is embedded with its exposed surface being flush with the surface of the outer cylinder 83 as described previously. Alternatively, the electrode 87 may be formed either by printing or etching a conductive material or by coating the outer cylinder 83 with a conductive paint or, as shown in FIG. 19, by winding or bonding a very thin metallic wire 92 such as tungsten filament having a diameter of 50 to 80 microns onto the surface of the outer cylinder 83. These alternatives would require no special means and processes during the manufacture and would be simpler and more useful than when the electrode 87 is embedded so as to be flush with the surface of the outer cylinder 83.

Figure 20:
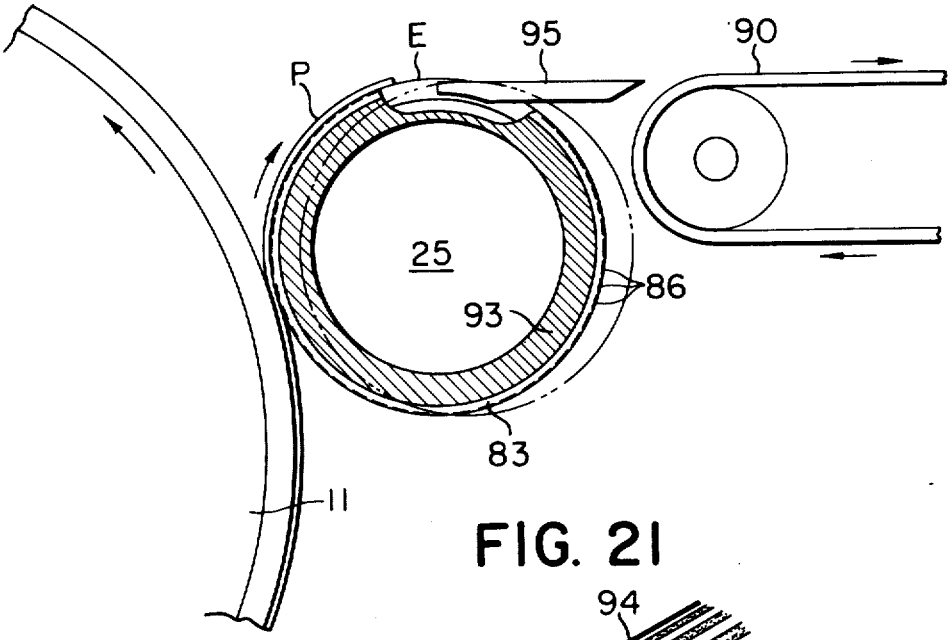
FIGS. 20 and 21 are a cross-sectional side elevation and a perspective view showing still another example of the transfer paper separation.
Figure 21:
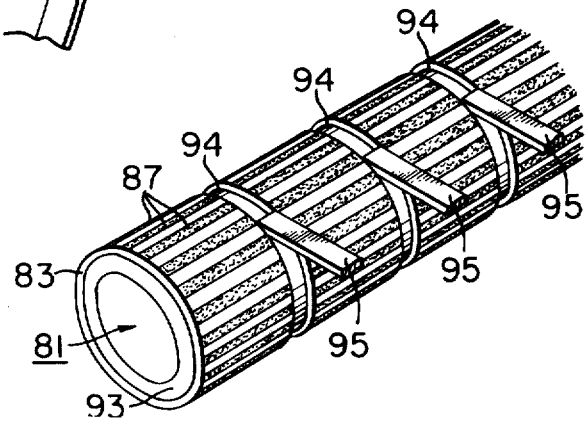

FIGS. 20 and 21 show a further example of the electrostatic chuck 81. The chuck shown there is in the form of a roller similar to that shown in FIGS. 16 and 17, but instead of the inner cylinder 82, it employs a cylindrical electrode 83 whose peripheral surface is formed with annular grooves 94 for engagement with separator member 95 adapted to separate a sheet of transfer paper P attracted to the roller-shaped electrostatic chuck 81. While a plurality of grooves 94 are shown to engage respective separator members 95, it is also possible to provide a single wide groove for engagement with a correspondingly wide, single separator member.

When the transfer paper P is electrostatically attracted to the electrostatic chuck 81 and moved clockwise to a point E in FIG. 20, the separator members 95 will contact the back side of the transfer paper P irrespective of the electrostatic force acting between the chuck 81 and the paper P, thereby separating the paper P from the electrostatic chuck 81 for delivery to conveyor belt 90.

In this instance, the mechanism for driving the electrostatic chuck 81 is the same as that shown in FIGS. 16 and 17. The cylindrical electrode 93 connected with a high DC voltage source and the electrode 87 of the outer cylinder 83 is grounded.

This arrangement permits a simpler construction of the electrostatic chuck 81 than that shown in FIGS. 16 and 17, and can achieve the same effect of attraction and separation as described with respect to FIGS. 16 and 17.

Figure 22:
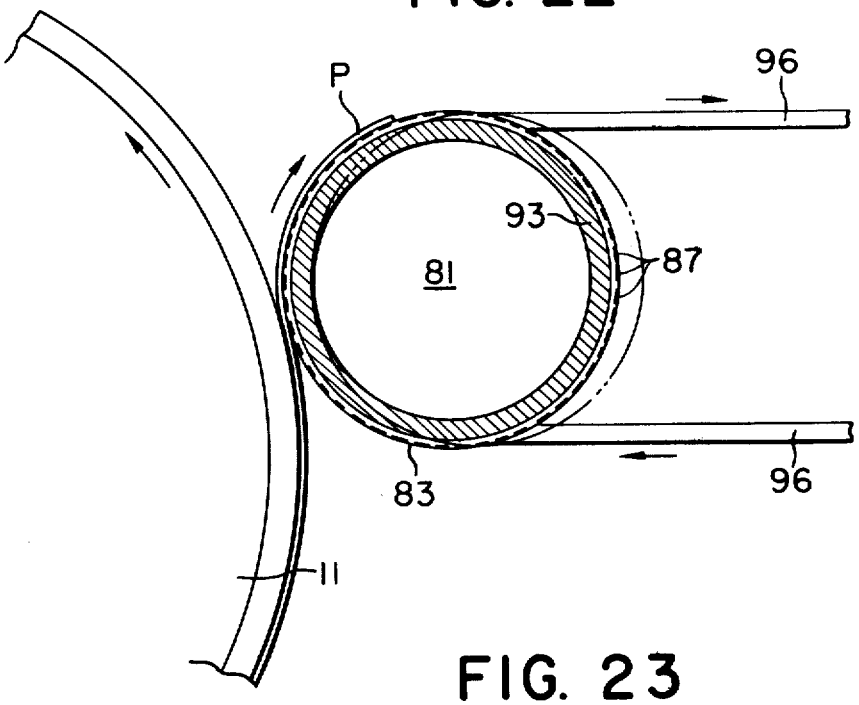
FIGS. 22 and 23 are a cross-sectional side elevation and a perspective view showing a modification of the separation shown in FIGS. 20 and 21.
Figure 23:
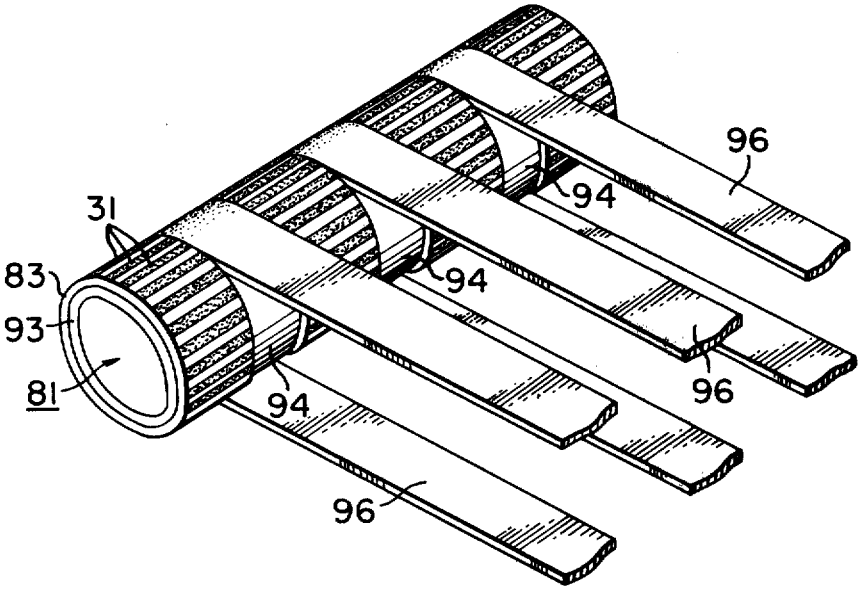

FIGS. 22 and 23 show a modification of the embodiment shown in FIGS. 20 and 21. A plurality of annular grooves are formed peripherally of the separator roller 81 and engaged by a corresponding number of conveyor belts 96, which separate the transfer paper P from the separator roller 81 and convey it to a subsequent process.

Although the electrodes 93 and 83 may be connected in the same way as described with respect to FIGS. 20 and 21, the present arrangement can make the separator and conveyor mechanism simpler in construction without adversely affecting its performance. The mechanism for driving the electrostatic chuck 81 in this case is again similar to that shown in FIGS. 16 and 17.

Figure 24:
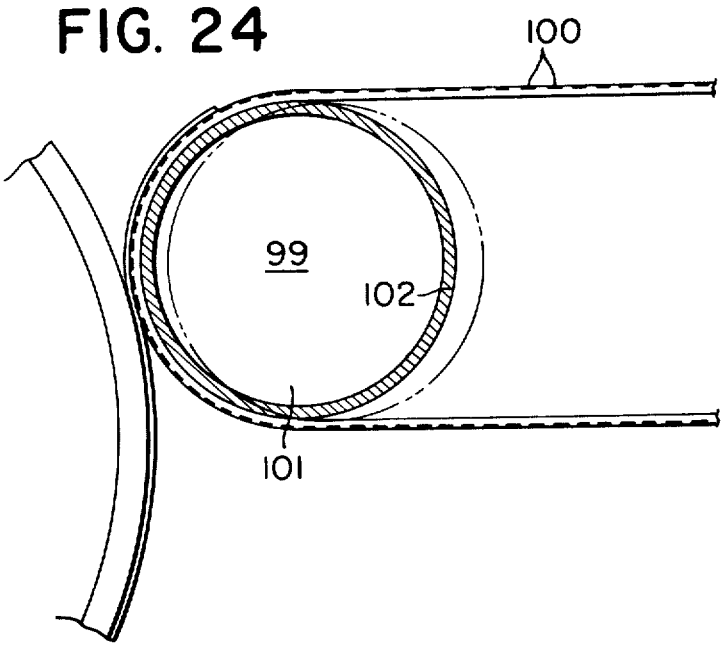
FIG. 24 is a cross-sectional side elevation showing a further example of the transfer paper separation.

FIG. 24 illustrates a further example of the electrostatic chuck which comprises a roller-shaped electrode member 99, a dielectric belt 98 would on the electrode member 99 and an electrode 100 formed on the belt 98. The roller-shaped electrode member 99 consists of a roller 101 having its surface covered with an electrode 102, which is connected with a high DC voltage source HV, and the electrode 100 on the dielectric belt 98 is grounded.

The principle and operation with which the transfer paper P is attracted is the same as in the previous case, but the present embodiment is simpler in construction and ensures more reliable separation.

Figure 25:
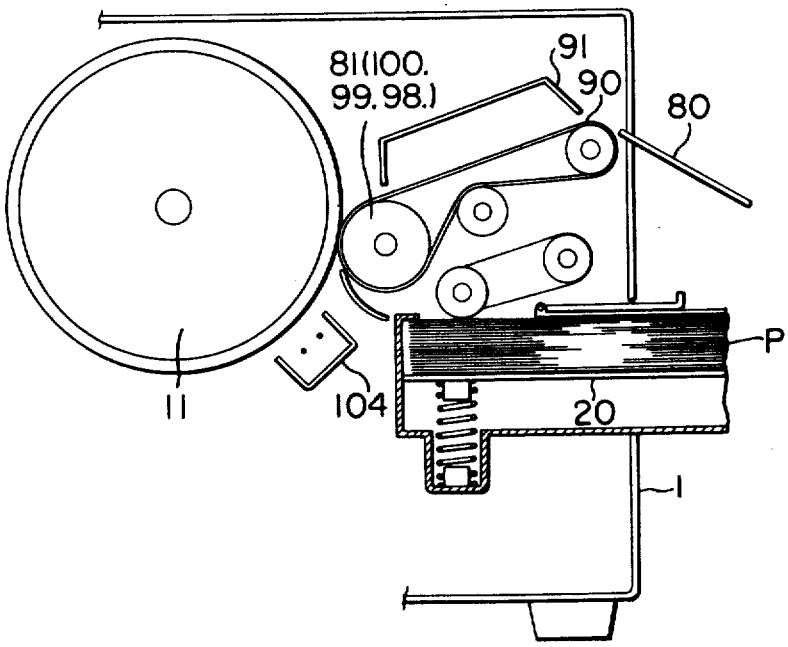
FIG. 25 is a side view showing a further example of the transfer paper separation.

FIG. 25 shows a construction in which the transfer paper P may be urged against the surface of the photosensitive drum 11 for image transfer when the paper P is attracted into contact with the electrostatic chuck 81 (99, 98 or 100) and immediately thereafter, the paper may be separated and conveyed for discharge.

Such construction ensures intimate contact of the transfer paper P with the electrostatic chuck 81 and then with the photosensitive drum 11, thus entirely preventing the occurrence of such an accident that the transfer paper P cannot successfully be separated from the electrostatic chuck 81 due to the insufficient attraction resulting from the unsatisfactory contact between the paper and the chuck.

As will be apparent from the foregoing, the present invention ensures the back side of the transfer paper in intimate contact with the photosensitive drum to be attracted into contact with the electrostatic chuck and then separated therefrom without imparting any adverse effect to the unfixed image formed on the transfer paper and without requiring any large-scale separator mechanism.

We claim:

1. A photographic copying machine of the through-slit exposure type comprising:

a housing;

a through-slit exposure device mounted in said housing;

sheet original conveyor means having a sheet passage for transporting a sheet original through said passage and past said through-slit exposure device to form the image of said sheet original on a photosensitive medium;

an original carriage mounted for reciprocal movement on said housing and having a transparent plate fixed thereto for supporting a thick original for a movement past said through-slit exposure device to form the image of said thick original on the photosensitive medium;

means integrally mounting said conveyor means on said carriage wherein said conveyor means is fixed against movement with respect to said carriage;

photographic copy processing means for operation to produce copies of said sheet original and thick original images on said photosensitive medium when one of said originals is moved past said exposure device; and drive system means releasably coupled to said conveyor means for operation to activate said conveyor means to transport said sheet original past said through-slit exposure device while maintaining said carriage in a predetermined stationary position when a sheet original is being copied, and means for decoupling said drive system means from said conveyor means when said carriage is reciprocated to move said thick original past said through-slit exposure device.

2. A photographic copying machine according to claim 1, wherein said original carriage has driven means, and further comprising means for coupling said driven means to said drive system means for moving said original carriage when said thick original is being copied.

3. A photograhic copying machine according to claim 1, further comprising control means for synchronizing the movement of said sheet and thick originals past said through-slit exposure device with the movement of said photosensitive medium, said control means including a first actuator member operated by said sheet original and a second actuator member operated by a cam formed in said original carriage.

4. Photocopying apparatus according to claim 1, wherein said transparent *plate* is disposed to provide a guide member for said sheet original.

5. Photocopying apparatus according to claim [5] *1*, further comprising locking means for maintaining said carriage in said predetermined stationary position wherein said locking means comprises a projecting member provided on said carriage and resilient holding means mounted on said housing for releasably grasping said projecting member.

*6. Electrophotographic copying apparatus selectively operable in a first mode for copying relatively thick originals and in a second mode for copying sheet originals comprising an exposure station through which an original to be copied is to be moved, an imaging station, an optical system for projecting an image of an original moving through said exposure station to said imaging station, means for moving an electrically photosensitive member through said imaging station for the formation of an electrostatic latent image of said original thereon, means for transferring images from said photosensitive member to copy material, an original support carriage capable of supporting relatively thick originals, means for moving said original support carriage along a path to carry such originals through said exposure station when the apparatus is operated in said first mode, a sheet conveyor integrally mounted on said carriage and operable to transport sheet originals through said exposure station, and releasable means for maintaining said carriage stationary when the apparatus is operated in said second mode.*

*7. Apparatus according to claim 6, wherein said carriage is arranged to be movable to a first position for selecting said first mode of operation and a second position for selecting said second mode of operation.*

*8. Apparatus according to claim 6, including a surface associated with said sheet conveyor for exposing sheet originals to be copied, and a surface associated with said original support carriage for exposing thick originals to be copied, said surfaces being substantially coplanar to form a substantially linear sheet original transport path on the sheet original exposing surface.*

*9. Apparatus according to claim 7, further comprising means for activating said means for moving said original support carriage when said carriage is disposed in said first position.*

*10. Apparatus according to claim 6, including means for developing the electrostatic latent images formed on said photosensitive member prior to operation of said transfer means.*

*11. Apparatus according to claim 10, including cleaning means for cleaning said photosensitive member after transfer therefrom of a developed image.*

*12. Apparatus according to claim 6, wherein the photosensitive member includes a photoconductive layer and an insulating layer, and includes means for applying a primary charge to said insulating layer in advance of said image projection and applying a secondary charge to the insulating layer simultaneously with the image projection, said secondary charge being with an A.C. corona device or a charge of polarity opposite to the primary charge, thereby forming said electrostatic latent image.*

*13. Apparatus according to claim 6, wherein said conveyor and said carriage are driven by a common drive mechanism, said conveyor being engaged with or disengaged from said drive mechanism according to whether said carriage is disengaged from or engaged with said drive mechanism.*

*14. Apparatus according to claim 6, further comprising a drive gear mounted on said apparatus, and a driven gear mounted on said sheet conveyor for engagement with said drive gear when said apparatus is operated in said second mode, wherein said gears disengage when said apparatus is operated in said first mode.*

*15. Apparatus according to claim 6, wherein said carriage carries a rack which engages a drive gear when the apparatus is operated in the first mode but which is disengaged therefrom when the apparatus is operated in the second mode.*

*16. Apparatus according to claim 6, including clutch means operable for stopping transport of the original, following initial movement thereof, and for re-starting said transport in synchronism with movement of the photosensitive member.*

*17. Apparatus according to claim 6, including separator means and means for creating electrostatic forces to attract copy material from the photosensitive member to the separator means to effect separation of the copy material from the photosensitive member.*

*18. Apparatus according to claim 17, wherein said separator means is a roller.*

*19. Apparatus according to claim 18, wherein said electrostatic force producing means comprises first electrode means on the surface of said roller, second electrode means inside the roller and separated from the first electrode means by dielectric material, and means for applying voltage between said first and second electrode means.*

*20. Photocopying apparatus selectively operable in a first mode for copying relatively thick originals and in a second mode for copying sheet originals comprising an exposure station through which an original to be copied is to be moved, an optical system for projecting an image of an original moving through said exposure station to an imaging station, means for moving a photosensitive member through said imaging station for the formation of an image of said original thereon, an original support carriage capable of supporting relatively thick originals, means for moving said original support carriage along a path to carry such originals through said exposure station when the apparatus is operated in the first mode, sheet conveyor means operable to transport sheet originals through said exposure station while said carriage is stationary when the apparatus is operated in the second mode, means integrally mounting said sheet conveyor means on said support carriage wherein said conveyor means is fixed against movement with respect to said carriage, and means for shifting the position of said original support carriage in response to operation of the apparatus in said first mode, and said second mode, said carriage being arranged to be movable to a first position for selecting said first mode of operation and a second position for selecting the second mode of operation.*

*21. Apparatus according to claim 20, including a surface associated with said sheet conveyor means for exposing sheet originals to be copied, and a surface associated with said original support carriage for exposing thick originals to be copied, said surfaces being substantially coplanar to form a substantially linear sheet original transport path on the sheet original exposing surface.*

*22. Apparatus according to claim 20, wherein the photosensitive member includes a photoconductive layer and an insulating layer, and includes means for applying a primary charge to said insulating layer in advance of said image projection and applying a secondary charge to the insulating layer simultaneously with the image projection, said secondary charge being with an A.C. corona device or a charge of polarity opposite to the primary charge, thereby forming said electrostatic latent image.*

*23. Apparatus according to claim 20, wherein said conveyor means and said carriage are driven by a common drive mechanism, said conveyor means being engaged with or disengaged from said drive mechanism according to whether said carriage is disengaged from or engaged with said drive mechanism.*

*24. Apparatus according to claim 20, further comprising a drive gear mounted on said apparatus, and a driven gear mounted on said sheet conveyor means for engagement with said drive gear when said apparatus is operated in said second mode, wherein said gears disengage when said apparatus is operated in said first mode.*

*25. Apparatus according to claim 20, wherein said carriage carries a rack which engages a drive gear when the apparatus is operated in the first mode but which is disengaged therefrom when the apparatus is operated in the second mode.*

*26. Apparatus according to claim 20, including clutch means operable for stopping transport of the original, following initial movement thereof, and for re-starting said transport in synchronism with movement of the photosensitive member.*

* * * * *